United States Patent
Antonov et al.

(10) Patent No.: US 8,955,120 B2
(45) Date of Patent: Feb. 10, 2015

(54) FLEXIBLE FINGERPRINT FOR DETECTION OF MALWARE

(71) Applicant: Kaspersky Lab ZAO, Moscow (RU)

(72) Inventors: Alexey E. Antonov, Moscow (RU); Alexey M. Romanenko, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/037,793

(22) Filed: Sep. 26, 2013

(65) Prior Publication Data

US 2015/0007319 A1    Jan. 1, 2015

(30) Foreign Application Priority Data

Jun. 28, 2013 (RU) .................... 2013129552

(51) Int. Cl.
*G06F 11/00* (2006.01)
*G06F 21/56* (2013.01)

(52) U.S. Cl.
CPC ..................................... *G06F 21/56* (2013.01)
USPC ............................................................ 726/22

(58) Field of Classification Search
None
See application file for complete search history.

(56) References Cited

U.S. PATENT DOCUMENTS

| | | | |
|---|---|---|---|
| 7,451,157 B2 | 11/2008 | Kaler et al. | |
| 7,617,231 B2 | 11/2009 | Moon et al. | |
| 7,747,582 B1 | 6/2010 | Kaminski, Jr. | |
| 7,779,253 B2 | 8/2010 | Douceur et al. | |
| 8,185,507 B1 * | 5/2012 | Kaminski, Jr. | ................ 707/698 |
| 8,230,510 B1 | 7/2012 | Yang et al. | |
| 8,266,115 B1 | 9/2012 | Park et al. | |
| 8,375,444 B2 | 2/2013 | Radhakrishnan et al. | |
| 8,413,235 B1 | 4/2013 | Chen et al. | |
| 8,438,174 B2 | 5/2013 | Shields et al. | |
| 8,463,000 B1 * | 6/2013 | Kaminski, Jr. | ................ 382/124 |
| 2006/0041597 A1 | 2/2006 | Conrad et al. | |
| 2007/0250521 A1 | 10/2007 | Kaminski, Jr. | |
| 2008/0162478 A1 | 7/2008 | Pugh et al. | |
| 2009/0187588 A1 | 7/2009 | Seide et al. | |

(Continued)

FOREIGN PATENT DOCUMENTS

| | | |
|---|---|---|
| CN | 102664875 | 9/2012 |
| EP | 2472425 | 7/2012 |
| RU | 101223 | 1/2011 |
| RU | 2454714 | 6/2012 |
| WO | WO2012075336 | 6/2012 |

OTHER PUBLICATIONS

Sadowski et al., "SimHash: Hash-based Similarity Detection", University of California, Santa Cruz. Dec. 13, 2007.

(Continued)

*Primary Examiner* — Anthony Brown
(74) *Attorney, Agent, or Firm* — Patterson Thuente Pedersen, P.A.

(57) ABSTRACT

System and method for analyzing a target object for similarity to classes of reference objects. A first and a second set of attributes of the target object is identified composed respectively of attributes having values that are common, and variable, among a class of similar objects. A first hash is computed representing the first set of attributes according to a first hashing algorithm that is sensitive to variations in the first set of attributes among the class of similar objects. A second hash representing the second set of attributes is computed according to a second hashing algorithm that is insensitive to variations in the second set of attributes among the class of similar objects. An aggregate representation of the target object that is based on the first hash and the second hash is generated.

29 Claims, 5 Drawing Sheets

(56) References Cited

U.S. PATENT DOCUMENTS

| | | | |
|---|---|---|---|
| 2009/0300761 | A1 | 12/2009 | Park et al. |
| 2010/0191734 | A1 | 7/2010 | Rajaram et al. |
| 2010/0192222 | A1 | 7/2010 | Stokes et al. |
| 2011/0083187 | A1 | 4/2011 | Malanov |
| 2011/0173698 | A1 | 7/2011 | Polyakov et al. |
| 2012/0017275 | A1 | 1/2012 | Harmonen |
| 2012/0159620 | A1 | 6/2012 | Seifert et al. |
| 2012/0167222 | A1* | 6/2012 | Kim et al. ............ 726/24 |
| 2012/0246718 | A1* | 9/2012 | Spears et al. ............ 726/21 |
| 2013/0031632 | A1 | 1/2013 | Thomas et al. |

OTHER PUBLICATIONS

"Detection of near-duplicate documents" accessed on Sep. 26, 2013. http://d3s.mff.cuni.cz/~holub/sw/shash/.

Charikar, "Similarity Estimation Techniques from Rounding Algorithms", Department of Computer Science. Princeton, NJ. May 19-21, 2002.

"Simhashing in Erlang-beauty with binary comprehension" posted on Aug. 23, 2009. http://blog.jebu.net/2009/08/simhashing-in-erlang-beauty-with-binary-comprehension/.

Broder et al., "SRC Technical Note/ Syntactic Clustering of the Web", Systems Research Center, Palo Alto, CA. Jul. 25, 2007.

Manku et al.,"Detecting Near-Duplicates for Web Crawling" Powerpoint presentation. 31 pages, as accessed on Sep. 26, 2013.

European Search Report for European Application No. EP13195205 dated Feb. 6, 2014.

Andoni et al., "Near-Optimal Hashing Algorithms for Approximate Nearest Neighbor in High Dimensions", Jan. 1, 2008. Communications of the ACM.

Jang et al., "BitShred: Fast, Scalable Malware Triage, BitShred: Fast, Scalable Malware Triage". Nov. 5, 2010. CMU Technical Reports.

Russian Search Report for Russian Application No. 2013129552/08(044013) dated Oct. 27, 2014.

* cited by examiner

FLEXIBLE FINGERPRINT FOR DETECTION OF MALWARE

CLAIM TO PRIORITY

The Application claims priority to Russian Federation Patent Application No. 2013129552 dated Jun. 28, 2013 the disclosure of which is incorporated by references herein.

FIELD OF THE INVENTION

The invention relates generally to information processing and communications technologies and, more particularly, to systems and methods for creating and using a flexible fingerprint, such as a hash, to classify files and detect malicious programs.

BACKGROUND OF THE INVENTION

Malware refers to computer programs able to cause harm using a computer system. Examples include network worms, keyboard spies, computer viruses.

Various antivirus technologies are used to protect users and their personal computers from possible malware. Antivirus software can include various computer threat detection techniques. Signature-based detection and heuristic detection are among some well-known examples. However, situations are possible where such techniques are not effective. Present-day malicious software is often designed with features that can counter software emulation (for example, the use of undocumented functions, analysis of function performance, e.g., checking whether certain processor flags have been set after the completion of functions, or analysis of returned error codes), as well as polymorph packagers. In this case, packaging of an executable file means compression of the file with an addition of unpacking instructions into the body of the file. If a polymorph packager is used, several files similar to the same malicious file are generated, which are identical by functionality but have different structures. In this case, the efficiency of the signature-based detection will not be high, because a unique signature will be needed for each file from the set of polymorph copies.

There is an alternative method for detecting malicious software, where, during the analysis of a file, various metadata of that file are considered. The metadata can vary depending on the type of the file in question. For instance, in the case of an executable file, such metadata can include the position of the file's sections, the size of the sections or other information from the header of the executable file, or string data extracted from the file. The following derived data can also be considered as metadata: information entropy (a measure of file information uncertainty), frequency characteristics of machine instructions or certain bytes. In case of a sufficiently large set of files and file attributes, a classification system is formed, which, when trained using a set of specified files, is able to compare a set of attributes highlighted in a file to some category of files, for example, the malicious software files category.

There are known solutions that detect malicious software based on metadata extracted from software files. For example, the invention described in U.S. Pre-Grant Pub. No. 2009/0300761 proposes a method for detecting malicious software files using an analysis of file metadata, in particular, information on the packager or unique strings. In this publication, sequences of pseudocode instructions are generated on a per-file basis and frequency characteristics of the instructions can be used as metadata. From the metadata highlighted in the file, an "intelligent hash" is generated; this is a hash which represents a string storing a set of file attributes needed for detecting malicious software files. The invention described in U.S. Pre-Grant Pub. No. 2010/0192222 proposes to additionally use the results of emulation and behavior analysis as metadata.

An important requirement for detecting malicious files based on highlighting metadata involves minimizing false positives. In known approaches, a file's degree of similarity to a pre-grouped set of files is calculated based on various measures of similarity, or "distances," between the sets of file metadata and file group metadata. This approach places a significant load on the computer network infrastructure that provides the data connection between a user's computer and a file metadata database containing pre-generated sets of files, particularly in cases where a large sets file metadata are to be transmitted for analysis using the computer network.

Although the above-described approaches are aimed at solving certain tasks in the field of protection against computer threats, they have a drawback in that they do not allow to achieve the desired quality of malicious files detection. More generally, there is a need for an effective and efficient solution for automatically detecting malware using file classification methods.

SUMMARY OF THE INVENTION

One aspect of the invention is directed to a system for identifying similar files, which includes computing resources including computing hardware and an operating system executing on the computing hardware, the computing hardware storing instructions that, when executed, cause the computing hardware to implement tie following modules.

An attribute identification module is configured to identify a first set of attributes of the target object. The first set of attributes consists essentially of attributes having values that are common among a class of similar objects that are similar to the target object, the class of similar objects being defined based on predefined similarity criteria. The attribute identification module is further configured to identify a second set of attributes of the target object, where the second set of attributes consists essentially of attributes having values that are variable among the class of similar objects;

An attribute hash generation module is configured to compute a first hash representing the first set of attributes. The first hash is computed according to a first hashing algorithm that is sensitive to variations in the first set of attributes among the class of similar objects. The attribute hash generation module is further configured to compute a second hash representing the second set of attributes, the second hash being computed according to a second hashing algorithm that is insensitive to variations in the second set of attributes among the class of similar objects.

An object hash generation module is configured to generate an aggregate representation of the target object that is based on the first hash and the second hash. The aggregate representation of the target object is prepared to be compared against at least one reference aggregate representation of one or more reference objects whereby a similarity determination indicates whether the target object is similar to the one or more reference objects.

In a related embodiment, an object hash comparison module is operatively coupled to the object hash generation module (hosted on a server coupled via computer network or is hosted locally on the same computer system as the other modules), and configured to compare the aggregate representation of the target object against at least one reference aggregate representation of one or more reference objects to produce a comparison result and to determine, based on the comparison result, whether the target object is similar to the one or more reference objects.

In an embodiment, a file attribute is considered to be variable if the attribute acquires various values for a set of similar files.

In another embodiment, a file attribute is considered to be fixed if the attribute acquires the same value for a set of similar files.

In yet another embodiment, the attribute hash generation module creates a hash of a file attribute subset, which includes at least one variable attribute and is invariant to the file attribute changes included in the specified subset of attributes.

In another embodiment, the file hash generation module additionally generates a file hash based on concatenation of file attribute subset hashes.

In yet another embodiment, the hash database stores information gathered on the basis of a set of clusters of similar files.

In another embodiment, the hash database stores information gathered on the basis of a set of clusters of similar files, which contains at least one cluster of malicious files similar to each other.

In yet another embodiment, the file comparison module considers the files to be similar if the degree of similarity between the files exceeds a preset threshold.

In another embodiment, the file comparison module determines the degree of similarity between files based on the degree of similarity between the data stored in the files.

In yet another embodiment, the file comparison module determines the degree of similarity between files based on the degree of similarity between the functionality of the files.

In another embodiment, the file comparison module uses a log of calls for API functions of the operating system during file execution emulation, as a file functionality.

In yet another embodiment, the file comparison module determines the degree of similarity between files based on one of the following distances: Hamming, Levenstein, Jaccard, Dice.

In another embodiment, the file comparison module considers the file to be malicious if the hash of the specified file matches the hash of similar malicious files.

Another aspect of the invention is directed to a method for analyzing a target object. In the method, a first set of attributes of the target object is identified, wherein the first set of attributes consists essentially of attributes having values that are common among a class of similar objects that are similar to the target object, the class of similar objects being defined based on predefined similarity criteria. A first hash is computed representing the first set of attributes, the first hash being computed according to a first hashing algorithm that is sensitive to variations in the first set of attributes among the class of similar objects. A second set of attributes of the target object is identified wherein the second set of attributes consists essentially of attributes having values that are variable among the class of similar objects. A second hash representing the second set of attributes is computed according to a second hashing algorithm that is insensitive to variations in the second set of attributes among the class of similar objects. An aggregate representation of the target object is generated that is based on the first hash and the second hash. The aggregate representation of the target object is compared against at least one reference aggregate representation of one or more reference objects to produce a comparison result. Based on the comparison result, the method determines whether the target object is similar to the one or more reference objects.

BRIEF DESCRIPTION OF THE DRAWINGS

The invention may be more completely understood in consideration of the following detailed description of various embodiments of the invention in connection with the accompanying drawings, in which.

Figure 1:
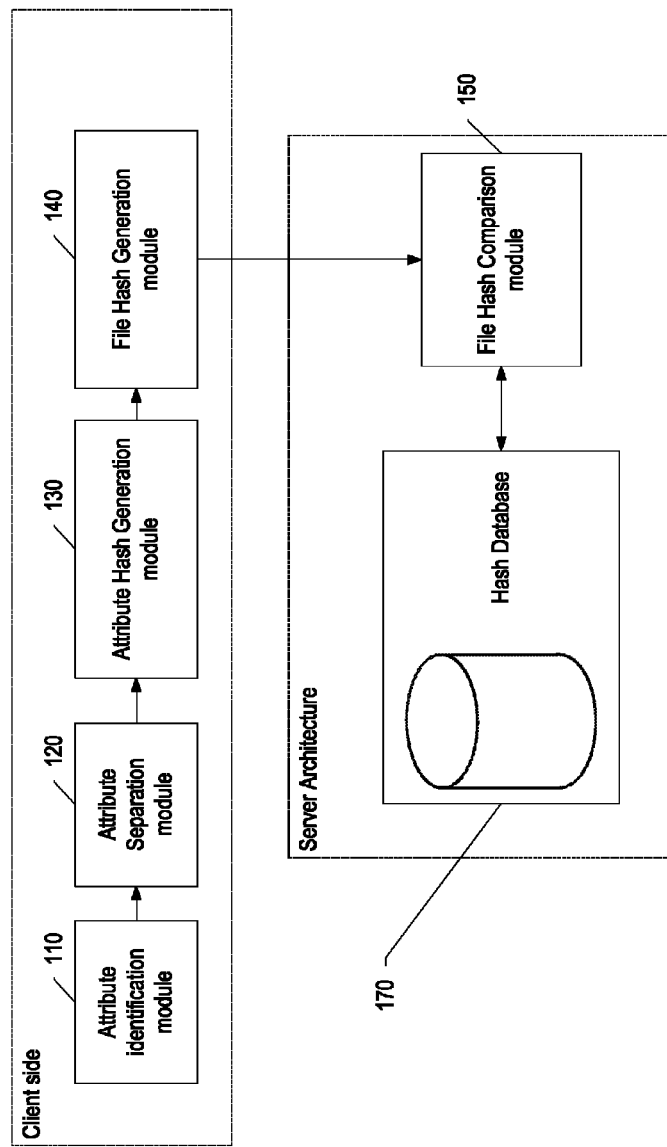
FIG. 1 is a block diagram illustrating a system for detecting malicious software according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines (e.g., system virtual machines, operating system-level virtual machines, process virtual machines, or any combination thereof) that in turn are executed on one or more physical machines. It will be understood by persons of skill in the art that features of the invention may be realized by a variety of different suitable machine implementations.

FIG. 1 is a block diagram illustrating the structure of a system for detecting malicious software according to one embodiment. The system includes various modules, each of which is constructed, configured, or otherwise adapted, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers (e.g., cluster nodes) that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out. In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

In one embodiment, the file to be analyzed is identified by an antivirus software application executing on a computer system, in response to a determination that the file requires additional analysis.

Attribute identification module 110 is configured to extract a set of attributes from the file to be analyzed. The set of attributes varies depending on the file type. In one embodiment, the exemplary detection system analyzes executable files of PE (Portable Executable) format. In a related embodiment, the set of attributes selected for the file type includes the following attributes: file size, file image size, number of file sections, RVA (Related Virtual Address) of the file's sections, RVA of the entry point, subsystem type, the file's characteristics from the COFF (Common Object File Format) header, respective location of directory table objects, location of directory table objects by file sections, type of compiler used for file creation, frequency characteristics of the symbols (including print symbols), the set of the file's strings and their number.

In one embodiment, the set of file attributes for each file section includes the following attributes: information entropy of the section's start and end, average value of non-zero bytes of the section's start and end, the section's virtual size, the section's physical size.

In one embodiment, attribute identification module 110 computes certain attributes based on reading certain contents of the file. For instance, the information entropy, the average value, etc., may be computed according to a predefined formula. Accordingly, one embodiment, attribute identification module 110 includes an attribute reference data structure that represents criteria for identifying attributes (or constituent data from which attributes are computed), a file reading module, a comparison module that compares the output from the file reading module to the attribute reference data structure's contents, and an attribute computation module that generates certain attributes from portions of the output of the file reading module determined to be constituent data for attributes to be computed. In one embodiment, the attribute computation module is configured to identify a set of strings for the PE file from the output obtained during emulation of the file's execution.

The set of attributes identified from the file are sent to the input of attribute separation module 120, which is configured to separate the set of attributes into at least two subsets. In one embodiment, the set of attributes is broken down into the following subsets: nominal attributes subset, quantity attributes subset, serial attributes subset, binary attributes subset. In another embodiment, the set of file attributes is broken down into the following subsets: a subset of attributes containing at least one variable attribute, and a subset of attributes containing at least one fixed attribute. A file attribute is considered to be variable if the attribute's value varies among a set of similar files. A file attribute is considered to be fixed if the attribute's value remains constant among a set of similar files.

In one embodiment, where the degree of similarity between files is quantified, files are considered to be similar if the degree of similarity between the files meets or exceeds a specified threshold. In one embodiment, the degree of similarity between files is determined based on the degree of similarity between the data stored in the files.

In another embodiment, the degree of similarity between the files is determined based on the degree of similarity between the functionality of the program instructions stored in the file. For example, a log of calls for API functions of the operating system during file execution emulation is representative of the functionality. In one embodiment, the degree of similarity is determined using Dice's distance; in another embodiment, the degree of similarity is determined using one of the following distances: Hamming, Levenstein, Jaccard.

Once attribute separation module 120 separates the set of attributes identified from a file into at least two subsets, one of which includes at least one variable attribute, while the other one includes at least one fixed attribute, the subsets of attributes are sent to the input of attribute hash generation module 130.

Figure 2:
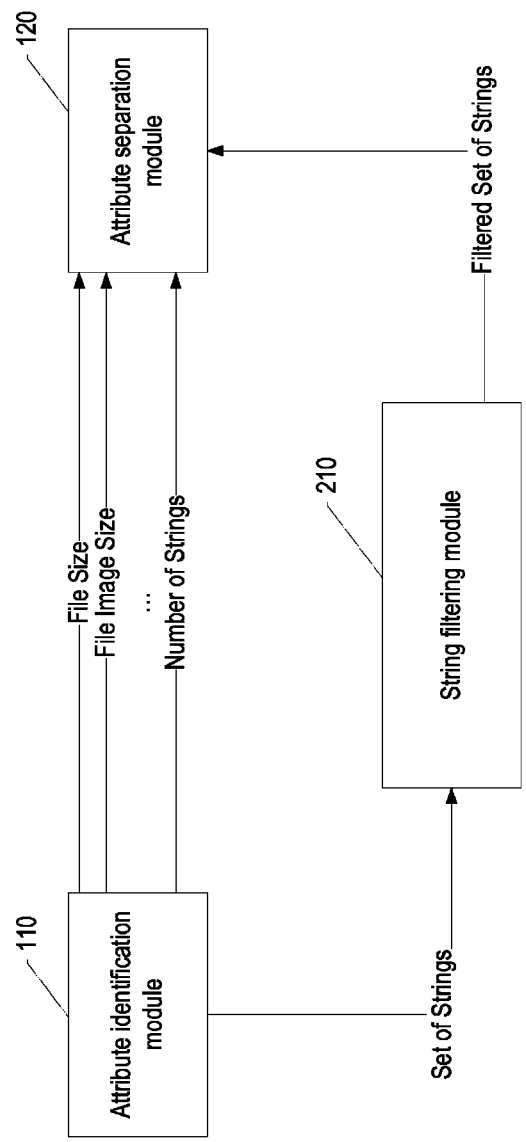
FIG. 2 is a diagram illustrating an exemplary interaction between the attribute identification module and the attribute separation module of the system of FIG. 1 according to one embodiment.

FIG. 2 illustrates an exemplary interaction between the attribute identification module 110 and the attribute separation module 120 according to one embodiment. In this example, the attribute identification module 110 transmits a set of identified strings to the input of the string filtering module 210. The string filtering module 210 performs filtration of the strings which are considered to have been generated at random—for example, the strings generated by malicious software to be used for creating a file path into which to copy malicious software files. The filtration is performed by determining the probability that the string belongs to a natural language specified by a dictionary. The strings and substrings with a low value of this probability (e.g., not exceeding a predefined threshold) are considered non-informative and are filtered.

Operation of the string filtering module 210 can be illustrated by the following example. Assume that a set of file strings includes the following strings: "klnsdfjnjrfhuiwenwethuinwfui", "GetDriveType", "C:\lkjsdfjkh\windows.txt". In case of filtration of the above list of strings, the first string will not be included in the resulting filtered set of strings, the second one will be included in it as-is, and the third one will be included in it in a modified form, "*\*\windows.*". The set of strings filtered in this manner, as well as the information on the quantity of strings from the filtered set, are sent to the input of the attribute separation module 120 as elements of the file attributes set.

In one embodiment, for a PE type file, a subset of attributes containing at least one variable attribute includes the following attributes: file size, file image size, number of file sections, RVA (relative virtual address) of the file sections, RVA of the entry point, respective location of directory table objects, frequency characteristics of symbols (including print symbols), the set of file strings and their quantity, the filtered set of strings and their quantity.

In one embodiment, the set of file strings is separated into a separate subset of attributes which includes at least one variable attribute. In another embodiment, a filtered set of file strings is separated into a separate subset of attributes which includes at least one variable attribute.

In one embodiment, in order to obtain PE-type file attributes which are to be included in the subset of attributes containing at least one fixed attribute, the following is identified from the file attributes set: attributes of the compiler used to create the file; subsystem type (NATIVE, WINDOWS_GUI, WINDOWS_CUI, OS2_CUI, POSIX_CUI, NATIVE_WINDOWS, WINDOWS_CE_GUI); file characteristics from the COFF header; location of directory table objects by file sections.

Attribute hash generation module 130 is configured to generate hashes of the subset of attributes which includes at least one fixed attribute (hereinafter referred to as a subset of fixed attributes), and the subset of attributes which includes at least one variable attribute (hereinafter referred to as "a subset of variable attributes"). Generally defined, a hash is a number generated from a string of text or binary symbols. The hash is substantially smaller than the string itself, and is generated by a formula in such a way that it is extremely unlikely that some other text will produce the same hash value.

The hash produced by hash generation module 130 for the subset of fixed attributes is generated in such a manner that it is sensitive to variations among the subset attributes. In other words, files having respectively different values for a common type of attribute, when processed by hash generation module 130, will produce different (i.e., non-invariant) hashes.

In one embodiment, a hash of a subset of fixed attributes represents a byte string and is generated by the attribute hash generation module 130 through concatenation of the string records of the value of each attribute separated by a special symbol, which, for example, can be an asterisk ("*") symbol. For example, for a console-type application compiled using the Microsoft Visual Studio 2008 compiler, the concatenated subset of non-variable attributes to be hashed will appear as follows: "WINDOWS_CUI*MSVS2008."

The hash of subset of variable attributes is generated in such a manner that it is not sensitive to modifications of subset attributes. Thus, files having respectively different values for a common type of attribute, when processed by hash generation module 130, will produce the same (i.e., invariant) hashes.

In one embodiment, when a set of strings (including a filtered set of strings) is separated from a subset of variable attributes into a separate subset, this creates a need to ensure the invariance of the hash of that subset, which consists of strings.

In a related embodiment, the invariance of the hashes of variable attribute subsets is achieved by excluding from such subsets a set of attributes whose values are variable within the set of similar files. Therefore, the sets of variable attributes for two similar files will be identical, and, regardless of the generation method, the attribute hashes will be identical as well.

In another embodiment, the invariance of the hashes of variable attribute subsets is achieved by establishing, for each of the attributes characterized by the value of one or multiple bytes, of a numerical window characterizing the minimum and maximum value acquired by each byte which characterizes the attribute. In one embodiment, the hash is obtained by concatenation of the byte code of the attributes, taking into account the established window for each byte characterizing a file attribute.

In another embodiment, the invariance of the hashes of variable attribute subsets is achieved by using hashes which have a locality sensitive hashing (LSH) property.

In one embodiment, the invariance of the file string subset hash is ensured by using cosine hashing, resulting in a sequence of bytes. A hash obtained in this manner is a hash of a subset of attributes consisting of strings extracted from the subject file.

In one embodiment, in order to ensure invariance of the variable attributes subset hash, the attribute hash generation module 130 creates a variable attribute subset hash based on the Semi-Supervised Hashing (SSH) algorithm. The advantage of using this algorithm for solving a LSH problem is determined by the generation of an optimum hash function for the variable attribute subset hash during the training of the algorithm to be used.

Figure 3:
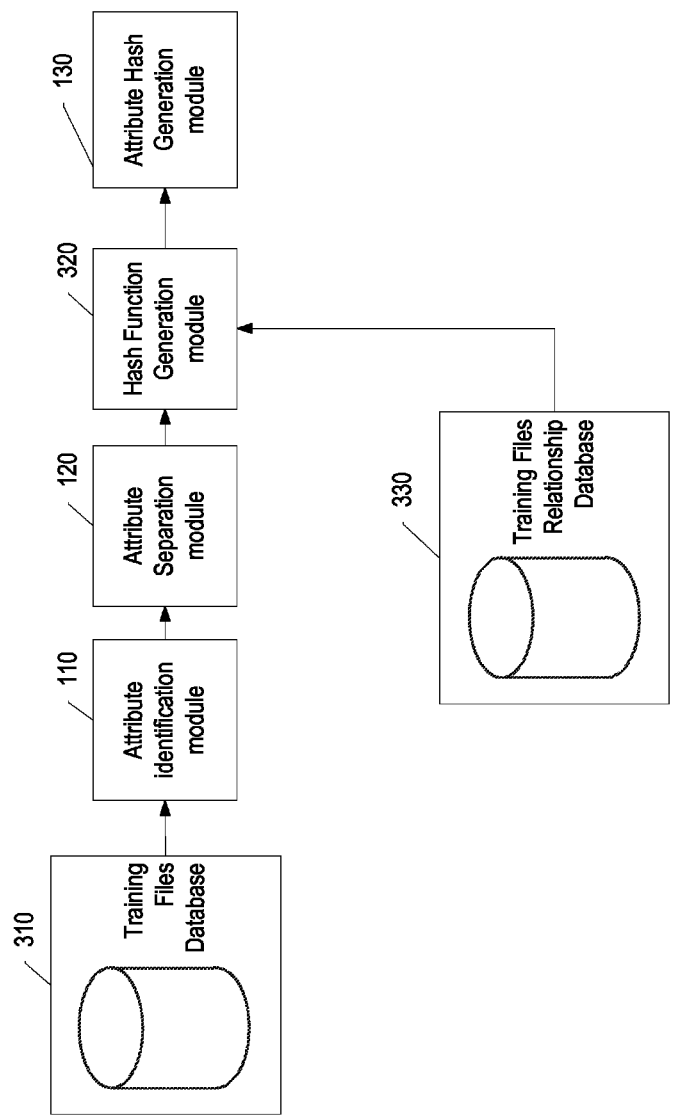
FIG. 3 is a block diagram illustrating generation, by the system of FIG. 1, of a hash function at a learning stage.

FIG. 3 is a structural block diagram illustrating a system for hash function generation within the SSH algorithm training stage according to one embodiment. For all files from training files database 310, the attribute identification module 110 identifies a set of attributes. The selection of sets of identified attributes for each file from the database 310 are sent to the input of the attribute separation module 120. The attribute separation module 120 separates a subset of variable attributes from each incoming selection of attributes. Selections of such subsets of attributes, corresponding to files from the training files database 310, are sent to the hash function generation module 320 in the form of attribute byte value vectors.

Hash function generation module 320 is interfaced with training files relationship database 330, from which it obtains a set of similarity relations between the files stored in the training files database 310. In one embodiment, the similarity relation is in the form of a tuple storing identifiers of files from the database 310, the relations between which are being considered, and an identifier of the similarity relation between the specified files.

In an example of the training files relationship database 330, the similarity relation is characterized by one of the following values: "similar", "different", "relation unknown". The "similar" value is applied to a pair of similar files. For pairs of non-similar files, a "different" similarity value is established. If, for a pair of files from the training files database 310, the similarity relation is not expressly specified, the similarity relation is established as "relation unknown."

In one exemplary approach, the "different" similarity relation is applied to a pairing of files that includes a malicious file and a non-malicious file, while the "similar" relation is applied to pairings of files that consist of similar malicious files. In another embodiment, the "similar" relation is applied to pairings of similar non-malicious files.

Having received information on vectors of variable file attributes and on similarity relations between files, the hash function generation module 320 is configured to perform a tuning, or adjustment, of the hash function in accordance with the SHH algorithm training stage. Accordingly, in one embodiment, a set of vectors of variable file attributes is considered as a set of points in n-dimensional hyperspace, where n is the number of attributes from the set of variable attributes. The hash function generation module 320, on the basis of the SSH algorithm training stage, divides the hyperspace by planes, in such a manner that the files for which a "similar" similarity relation is specified remain on the same side of a plane, while the files for which a "different" similarity relation is specified remain on different sides of a plane. The training process results in a calculation of coefficients that define the planes dividing the hyperspace. Such coefficients may be represented in the form of a matrix. The hash function generation module 320 sends the matrix of coefficients to the input of the attribute hash generation module 130. In turn, the attribute hash generation module 130, using the matrix of coefficients, generates, for each incoming selection of attributes (selected from a subset of variable attributes) grouped as a vector, a hash of a variable-attribute subset, which is a sequence of bytes.

A particular feature of the above-described hash generation mechanism is that, for a selection of attributes of two files, an identical hash will be generated if a "similar" similarity relation was established at the SSH algorithm training stage for the files used to highlight the attributes. However, the hashes of the selections of attributes of two files whose relation was established as "different" will differ. The method for generating a hash function to obtain a hash of a subset of variable attributes guarantees the invariance of the hash to variations of the attributes from the subset of variable attributes. This means that the hashes of the selections of a subset of variable attributes of two similar files will be identical even if any attributes from the subset of variable attributes of those files have different values.

Referring again to FIG. 1, The input of the file hash generation module 140 receives hashes of all identified subsets of attributes from the attribute hash generation module 130. A hash of each subset of attributes is a sequence of bytes. A file hash is generated by combining hashes of file attribute subsets. Being generated on the basis of invariant hashes of variable attribute subsets and hashes of non-variable attribute subsets, a file hash also has invariance, i.e., having an identical value for each file of a set of similar files.

In one embodiment, the file hash generation module 140 is configured to generate a file hash as a concatenation of attribute subset hashes.

In another embodiment, the file hash generation module 140 is configured to generate a file hash based on cosine hashing applied to hashes of file attribute subsets.

In yet another embodiment, the file hash generation module 140, having generated a file hash, additionally calculates the hash function of the file hash, and, subsequently, the calculated value of the hash function is considered to be the file's hash. In an embodiment, the file hash generation module 140 uses MD5 as the hash function applied to the file hash.

After calculating a file hash, the file hash generation module 140 sends the generated hash of the file under analysis to the file hash comparison module 150. The file hash comparison module 150 is coupled with hash database 170.

The file hash comparison module 150 is configured to compare the hash received from the file hash generation module 140 with a set of file hashes. File hash database 170 is a module that stores that set of file hashes.

In addition to storing file hashes, file hash database 170 stores identifiers of the files corresponding to the hashes, as well as information on the maliciousness of the files whose hashes are stored in the database. The file hashes stored in the hash database 170 are pre-generated in accordance with the above-described file hash generation method. During the generation of a selection of hashes for the hash database 170, clusters of similar files are used. In an embodiment, at least one file cluster used to generate a hash which will be stored in the hash database 170 consists of a set of malicious files.

If, during the comparison of the hash of the file under analysis performed by the file hash comparison module 150 the module finds an identical hash among the hashes stored in the hash database 170, the file hash comparison module 150 determines the file under analysis to be similar to the files from the cluster of similar files, taken as a basis for generating the hash in the hash database 170.

In an embodiment, the file hash comparison module 150 determines the file to be malicious if it was considered similar to the files from the cluster of similar files which are malicious files. The information on the maliciousness of the files used to generate a hash to be included in the hash database 170 is assigned during the creation of the relevant record in the database.

In an embodiment, the files analyzed by antivirus software on a user computer are used as incoming data for the attribute identification module 110. The result of the analysis of a file under consideration using the modules described as part of the invention is used in combination with other user protection modules provided by antivirus software in order to increase the degree of user protection.

In one embodiment, the hash database 170 and the file hash comparison module 150 are part of a server architecture communicatively coupled with a client-side computer system, which executes the modules described above that are employed to generate a file hash. In another embodiment (not shown), the hash database 170 and the file hash comparison module 150 are both executed on a single computer system, such as a personal computer.

Figure 4:
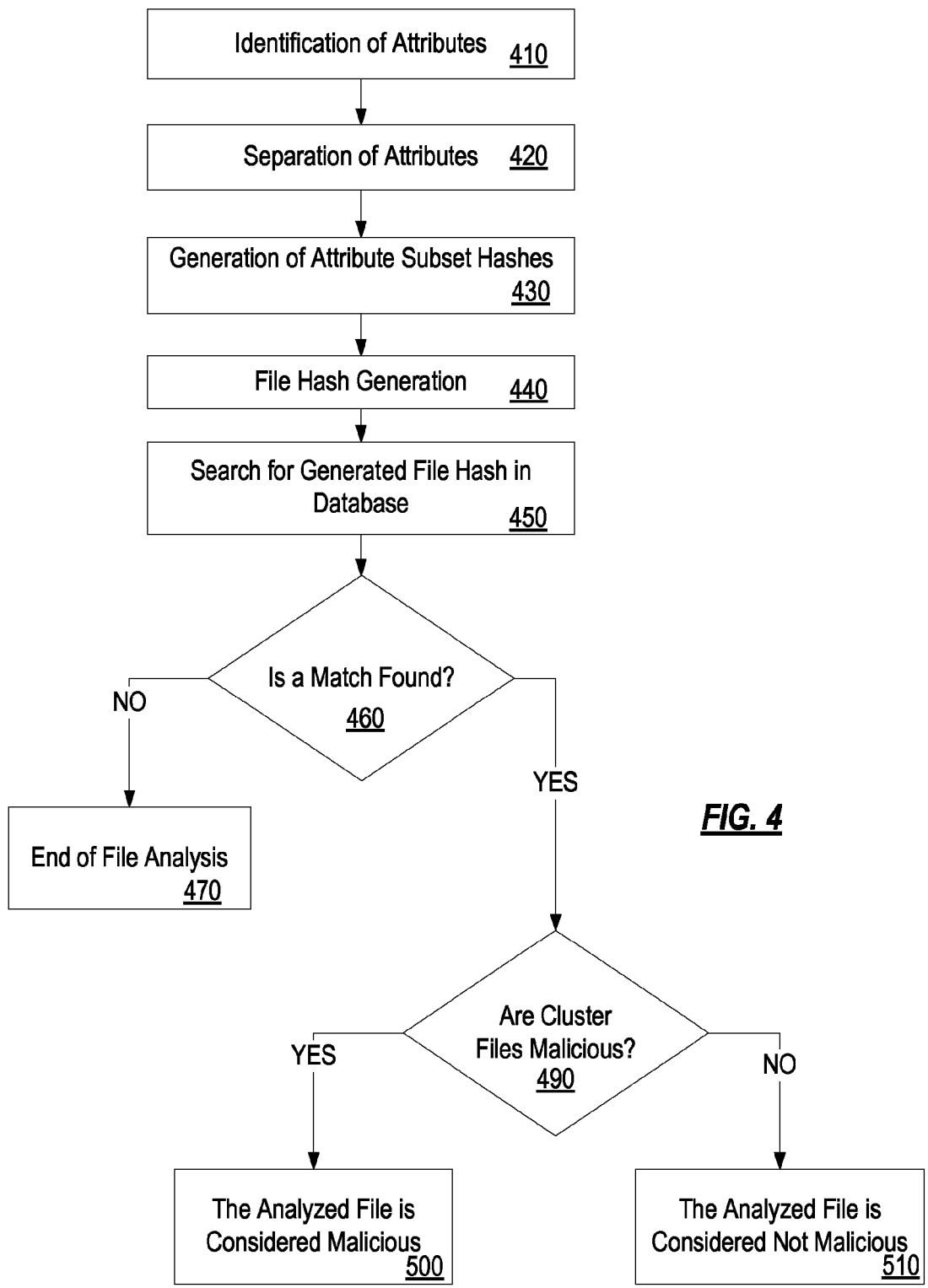
FIG. 4 is a flow diagram illustrating an exemplary algorithm for detecting malicious software according to one embodiment.

FIG. 4 is a flow diagram illustrating an exemplary computer-implemented process according to one embodiments of the invention. At 410, a set of file attributes is identified. At 420, the set of the identified file attributes is separated into at least one subset containing at least one variable attribute and at least one subset containing at least one fixed attribute. At 430, hashes of each of the incoming file attribute subsets are generated. At 440, having obtained hashes of each file attribute subset, the file's hash is generated. As described above, this can be achieved as a concatenation of attribute subset hashes.

At stage 450, a search is performed in the file hash database for that hash among a set of pre-generated hashes. If, at decision 460, the file hash comparison detects a match between the hash of the file under analysis and the hash from the hash database 170, the file under analysis will be considered similar to the files from the cluster of similar files which were used to generate the hash matching the hash of the file under analysis. If, at 490, it is found that a cluster of similar malicious files was used to generate the matching hash, then the file under analysis will be deemed malicious at 500. If, at stage 490, it is found that a cluster of similar non-malicious files was used to generate the matching hash, then the file under analysis will be deemed non-malicious at 510.

Figure 5:
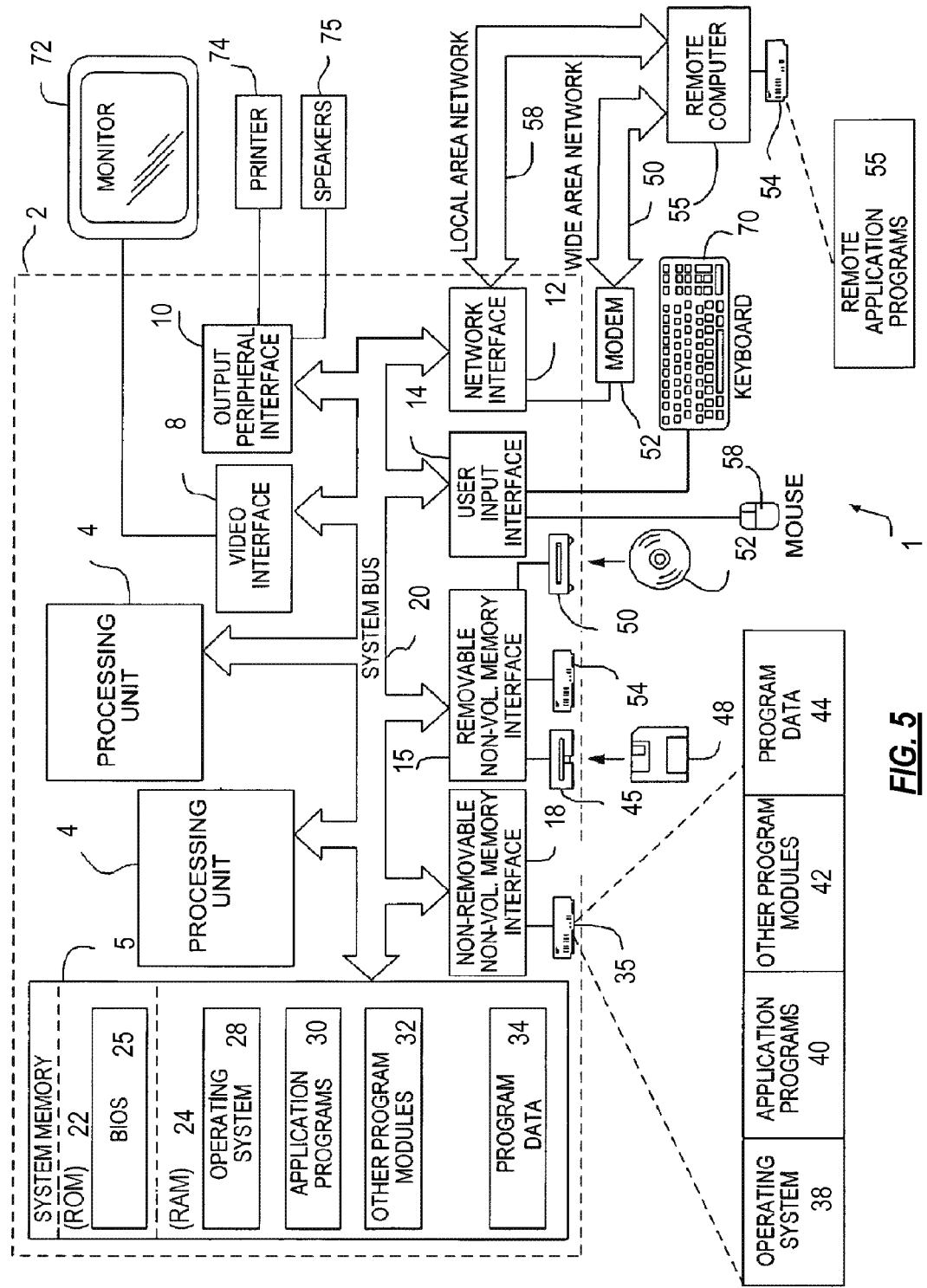
FIG. 5 is a block diagram illustrating a general-purpose computer system on which aspects of the invention can be implemented.

FIG. 5 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer 2 are within the spirit of the invention. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

The embodiments above are intended to be illustrative and not limiting. Additional embodiments are within the claims unless specifically excluded. In addition, although aspects of the present invention have been described with reference to particular embodiments, those skilled in the art will recognize that changes can be made in form and detail without departing from the spirit and scope of the invention, as defined by the claims. For instance, although the embodiments above are described in the context of analyzing files, other objects or data structures besides files (multiple ones of which may be stored in a single file, or which may reside in memory but not in the file system) may be compared or analyzed using the principles described herein.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computing device comprising a plurality of computing resources including computing hardware and an operating system executing on the computing hardware, and a plurality of objects including executable objects stored in the computing hardware, a method for analyzing a target object, the method comprising:

identifying a first set of attributes of the target object, wherein the first set of attributes consists essentially of attributes having values that are common among a class of similar objects that are similar to the target object, the class of similar objects being defined based on predefined similarity criteria;

computing a first hash representing the first set of attributes, the first hash being computed according to a first hashing algorithm that is sensitive to variations in the first set of attributes among the class of similar objects;

identifying a second set of attributes of the target object, wherein the second set of attributes consists essentially of attributes having values that are variable among the class of similar objects;

computing a second hash representing the second set of attributes, the second hash being computed according to a second hashing algorithm that is insensitive to variations in the second set of attributes among the class of similar objects;

generating an aggregate representation of the target object that is based on the first hash and the second hash; and comparing the aggregate representation of the target object against at least one reference aggregate representation of one or more reference objects to produce a comparison result;

determining, based on the comparison result, whether the target object is similar to the one or more reference objects.

2. The method of claim 1, wherein the target object is a file.

3. The method of claim 1, wherein the one or more reference objects include reference objects deemed malicious and reference objects deemed non-malicious; and wherein in the determining of whether the target object is similar to the one or more reference objects, the comparison result is indicative of similarity of the target object to the malicious or non-malicious reference objects.

4. The method of claim 1, wherein generating the aggregate representation of the target object includes concatenating the first hash and the second hash into a string.

5. The method of claim 1, wherein in identifying of the first set of attributes of the target object and in identifying of the second set of attributes of the target object, strings within the target object are filtered to disregard strings that are considered to have been generated at random.

6. The method of claim 1, wherein in identifying of the first set of attributes of the target object and in identifying of the second set of attributes of the target object, at least one attribute of the first or the second set is computed based on applying a formula to constituent data present in the target object.

7. The method of claim 1, wherein in identifying of the first set of attributes of the target object and in identifying of the second set of attributes of the target object, the first set of attributes are predefined as fixed attributes that are fixed among a set of reference objects deemed similar and the second set of attributes are predefined as variable attributes that are variable among the set of reference objects deemed similar.

8. The method of claim 1, wherein in computing the second hash, variable attributes predefined as being variable among similar objects are excluded according to the second hashing algorithm.

9. The method of claim 1, wherein in computing the second hash, variable attributes predefined as being variable among similar objects are represented by value ranges according to the second hashing algorithm.

10. The method of claim 1, wherein in computing the second hash, the second hashing algorithm includes a locality sensitive hashing property.

11. The method of claim 1, wherein in computing the second hash, the second hashing algorithm includes cosine hashing.

12. The method of claim 1, wherein in computing the second hash, the second hashing algorithm includes a semi-supervised hashing algorithm in which a hash function is generated based on a training stage that incorporates similarity criteria that defines measures of similarity among the class of similar objects.

13. The method of claim 1, wherein the one or more reference objects are classified as similar based on a degree of similarity among data contained by the one or more reference objects.

14. The method of claim 1, wherein the one or more reference objects are classified as similar based on a degree of similarity among functionality of the one or more reference objects.

15. A system for preparing a target object for comparison against a set of reference objects, the system comprising:

computing resources including computing hardware and an operating system executing on the computing hardware, the computing hardware storing instructions that, when executed, cause the computing hardware to implement:

an attribute identification module configured to identify a first set of attributes of the target object, wherein the first set of attributes consists essentially of attributes having values that are common among a class of similar objects that are similar to the target object, the class of similar objects being defined based on predefined similarity criteria, and identify a second set of attributes of the target object, wherein the second set of attributes consists essentially of attributes having values that are variable among the class of similar objects;

an attribute hash generation module configured to compute a first hash representing the first set of attributes, the first hash being computed according to a first hashing algorithm that is sensitive to variations in the first set of attributes among the class of similar objects, and to compute a second hash representing the second set of attributes, the second hash being computed according to a second hashing algorithm that is insensitive to variations in the second set of attributes among the class of similar objects; and an object hash generation module configured to generate an aggregate representation of the target object that is based on the first hash and the second hash;

wherein the aggregate representation of the target object is prepared to be compared against at least one reference aggregate representation of one or more reference objects whereby a similarity determination indicates whether the target object is similar to the one or more reference objects.

16. The system of claim 15, further comprising:

an object hash comparison module operatively coupled to the object hash generation module, and configured to compare the aggregate representation of the target object against at least one reference aggregate representation of one or more reference objects to produce a comparison result and to determine, based on the comparison result, whether the target object is similar to the one or more reference objects.

17. The system of claim 16, further comprising:
a hash database operatively coupled to the object hash comparison module and configured to store the reference aggregate representation of each of the one or more reference objects.

18. The system of claim 16, wherein the one or more reference objects include reference objects deemed malicious and reference objects deemed non-malicious; and
wherein in the comparison result is indicative of similarity of the target object to the malicious or non-malicious reference objects.

19. The system of claim 15, wherein the target object is a file.

20. The system of claim 15, wherein the aggregate representation of the target object includes a concatenation of the first hash and the second hash into a string.

21. The system of claim 15, further comprising:
a string filtering module configured to filter strings within the target object to disregard strings that are considered to have been generated at random.

22. The system of claim 15, wherein the first set of attributes are predefined as fixed attributes that are fixed among a set of reference objects deemed similar to one another and the second set of attributes are predefined as variable attributes that are variable among the set of reference objects deemed similar to one another.

23. The system of claim 15, wherein variable attributes predefined as being variable among similar objects are excluded according to the second hashing algorithm.

24. The system of claim 15, wherein variable attributes predefined as being variable among similar objects are represented by value ranges according to the second hashing algorithm.

25. The system of claim 15, wherein the second hashing algorithm includes a locality sensitive hashing property.

26. The system of claim 15, wherein the second hashing algorithm includes cosine hashing.

27. The system of claim 15, wherein the second hashing algorithm includes a semi-supervised hashing algorithm in which a hash function is generated based on a training stage that incorporates similarity criteria that defines measures of similarity among the class of similar objects.

28. The system of claim 15, wherein the one or more reference objects are classified as similar based on a degree of similarity among data contained by the one or more reference objects.

29. The system of claim 15, wherein the one or more reference objects are classified as similar based on a degree of similarity among functionality of the one or more reference objects.

* * * * *